Patented July 27, 1948

2,446,162

UNITED STATES PATENT OFFICE 2,446,162

DEHYDRATION OF CORN

Paul W. Salo, Minneapolis, Minn., assignor to General Mills, Inc., a corporation of Delaware No Drawing. Application February 12, 1944, Serial No. 522,175

5 Claims. (Cl. 99—204)

The present invention relates to an improved process of dehydrating corn, preferably sweet corn, and more particularly to the preparation of dehydrated corn preserving the natural flavor, tenderness and color.

Corn dehydrated in a conventional manner becomes hard and flinty and loses its characteristic fresh corn flavor. Moreover, it acquires a dark color so that it no longer resembles the fresh product. Accordingly, such corn is of extremely limited acceptability commercially and is an exceedingly poor substitute for the fresh product. I have found that by means of the present invention it is possible to preserve the natural flavor, tenderness and color of the corn and at the same time obtain a product which will reconstitute with comparative ease.

It is therefore a primary object of the present invention to provide a process of dehydrating corn whereby the natural flavor, tenderness and color are preserved.

It is a further object of the present invention to provide a process of dehydrating corn which will reconstitute with comparative ease.

It is another object of the present invention to provide an improved dehydrated corn product having the characteristics mentioned above.

These and other objects of the present invention will be apparent from the following description of the invention with particular reference to specific details which are to be understood as illustrative only and not as limiting the invention.

Broadly, the invention involves the following steps. Corn is husked, washed, blanched, preferably on the cob, cut off the cob, dried to a suitable moisture content, deformed so as to alter the natural cellular structure, and may be further dried to a low moisture content at which the product is stable. The most important step in the invention is the deformation of the corn so as to alter its cellular structure which overcomes the tendency of ordinary dehydrated corn to be tough and flinty. At the same time the flavor and color of the fresh corn can be largely preserved.

Many of the steps of the present process are conventional in commercial canning operations. The husking, washing, blanching and cutting of the corn may follow very closely present commercial operations. The blanching step is employed primarily for the purpose of setting the milk of the corn sufficiently that the kernels will not lose their shape when cut from the cob. I have found that this may be accomplished by a 5 to 20 minute immersion in hot water or steam. The time involved depends to a large extent upon the condition of the corn at the time it is harvested. If the corn is not quite mature the interior of the kernel is largely liquid and consequently requires a more drastic blanching treatment in order to sufficiently solidify the kernel so that it will maintain its shape when cut from the cob. Likewise, if the corn is quite mature, the amount of blanching may be correspondingly reduced. These factors are well known in the canning industry and the experience found useful there may likewise be employed in the present invention. Under certain circumstances it may be desirable to first cut the corn from the cob and then blanch it, and it is to be understood that the invention includes such a sequence of steps. This sequence of operations is desirable, for example, where it is sought to conduct the dehydration process in a canning plant where preliminary blanching is not employed.

The kernels may be cut from the cob in the conventional manner employed for whole kernel corn. The kernels thus obtained, if previously blanched, are then carefully dried, for example at from 150° F.–180° F., although other drying conditions which are not injurious to the corn may be used. The moisture content of the corn is preferably reduced to within the approximate range of 10 to 30 per cent, although it is possible to carry out the invention less desirably outside this range. At about this moisture content the kernels are deformed to such an extent that the natural cellular structure is disrupted and the tendency for the formation of a hard, flinty structure is overcome. The deformation may take almost any form as, for example, by impact, rolling, and the like. I prefer, however, to pass the corn between rolls to accomplish the desired deformation. In fact for many uses of the corn, it is highly desirable that the rolls be set so as to produce a flaked product. This product may vary in thickness considerably but it is usually desirable to obtain flakes varying in thickness between .010 and .080", preferably within the range .020 to .040".

The deformation step is desirably performed upon the product very shortly after the drying has been completed as it is found preferable to have a higher moisture content in the center of the kernel than near the exterior. In this way the center with its higher moisture content serves as a binder to hold the kernel together. If the moisture content were uniform throughout, the kernels, particularly at the lower moisture contents of the range mentioned above, would have a tendency to shatter during deformation and consequently there would be a possibility of producing an excessive amount of fines.

After deformation it is usually desirable to further reduce the moisture content of the product although, if the deformation has occurred at a sufficiently low moisture content, this may not be necessary. I prefer, however, to reduce the moisture content to approximately 5 per cent as it is found that at this low figure the keeping qualities of the product are greatly enhanced.

The product thus obtained may be used in any manner desired and in most instances is found to be a good substitute for the fresh vegetable. It is particularly adapted for use in soups and chowders in which it is found highly desirable to have corn particles of appreciable size and at the same time having sufficient fine particles to give the product some of the characteristics of a puree type soup. For this purpose the flaked product is found to be best suited and preferably a product having a thickness of approximately .020 to .040". Such a product can be made to disintegrate somewhat on rehydration to give a mixture of large and fine particles.

The product produced as described above has the light color characteristic of the starting material and reconstitutes readily to a tender, fresh tasty product.

While the invention has been described with particular reference to the detailed example, it is to be understood that the same is not limited thereto, but may be varied within the scope of the following claims.

I claim as my invention:

1. Process of dehydrating corn which comprises blanching the corn, partially dehydrating the corn, then deforming the corn kernels while at a moisture content within the approximate range of 10% to 30% so as to alter their natural cellular structure without reducing the kernels to a finely divided condition.

2. Process of dehydrating corn which comprises blanching the corn on the cob, cutting the kernels from the cob, dehydrating the kernels to a moisture content within the approximate range of 10 to 30 per cent, flattening the dehydrated kernels to form flakes having a thickness within the approximate range of .010 to .080".

3. Process of dehydrating corn which comprises blanching the corn on the cob, cutting the kernels from the cob, dehydrating the kernels to a moisture content within the approximate range of 10 to 30 per cent, flattening the dehydrated kernels to form flakes having a thickness within the approximate range of .020 to .040".

4. Process of dehydrating corn which comprises blanching the corn on the cob, cutting the kernels from the cob, dehydrating the kernels to a moisture content within the approximate range of 10 to 30 per cent, deforming the kernels so as to alter the internal cellular structure without reducing the kernels to a finely divided condition, and then drying the deformed kernels to a moisture content at which the product is stable.

5. Process of dehydrating corn which comprises cutting the kernels from the cob, blanching the kernels, partially dehydrating the blanched kernels and deforming the kernels while at a moisture content within the approximate range of 10% to 30% so as to alter the internal cellular structure without reducing the kernels to a finely divided condition.

PAUL W. SALO.

REFERENCES CITED

The following references are of record in the file of this patent:

UNITED STATES PATENTS

| Number | Name | Date |
|---|---|---|
| 217,171 | Tilden | July 1, 1879 |
| 1,272,266 | Horn | July 9, 1918 |
| 1,297,204 | McLane | Mar. 11, 1919 |
| 1,686,785 | Zeller | Oct. 9, 1928 |
| 1,908,489 | Sartakoff | May 9, 1933 |
| 2,110,184 | Webb | Mar. 8, 1938 |
| 2,192,041 | Headland | Feb. 27, 1940 |
| 2,343,149 | Krause | Feb. 29, 1944 |
| 2,351,950 | Gernow | June 20, 1944 |